UNITED STATES PATENT OFFICE.

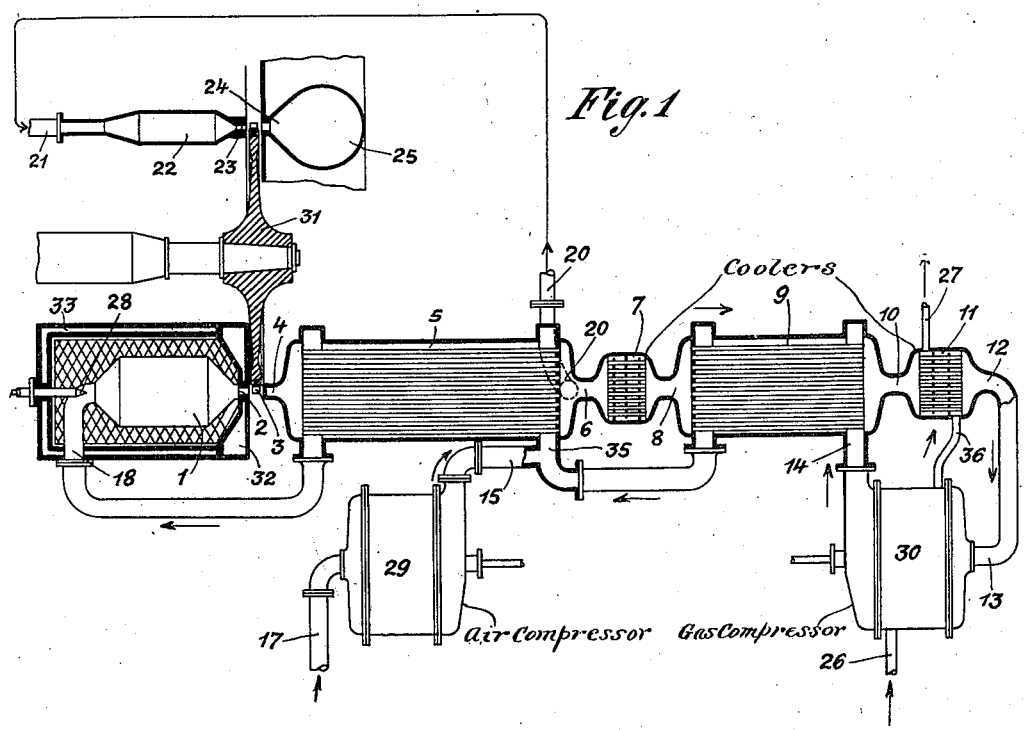

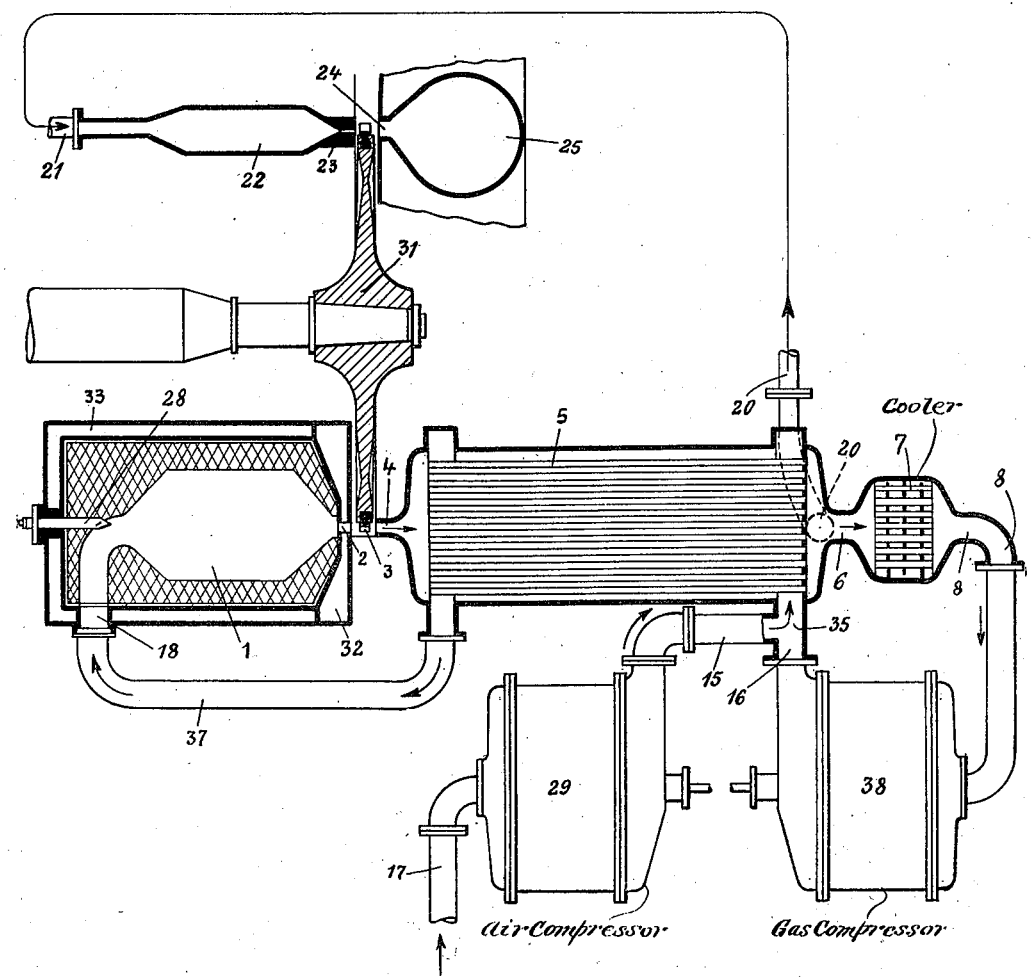

BERNHARD BISCHOF, OF RORSCHACH, SWITZERLAND.

COMBUSTION-TURBINE.

1,201,545.  Specification of Letters Patent.  Patented Oct. 17, 1916.

Application filed May 23, 1916. Serial No. 99,419.

*To all whom it may concern:*

Be it known that I, BERNHARD BISCHOF, a citizen of the Republic of Switzerland, residing at Rorschach, in the Canton of St. Gallen, Republic of Switzerland, have invented certain new and useful Improvements in and Relating to the Working of Combustion-Turbines and to Arrangements Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

It is known that in combustion turbines the utilization of the heat is the better the smaller the fall of pressure is relatively to the fall of heat, that is to say, the less compression work is performed in order to convert a certain amount of heat into work. This result is obtained, as is well known, when the temperature of combustion is kept so high that after expansion the highest temperature is attained that the material of the nozzles and of the blades can still support. Consequently, the utilization of heat is not satisfactory since a large proportion thereof escapes into the exhaust without being utilized. In order to recover the same it has been proposed to use regenerators; these however have the great disadvantage that they reach considerable dimensions, since, as it is well known, the transference of heat for gases and superheated vapors of atmospheric pressure is very small. This drawback can be removed as follows: It has been found by experiments that the transference of heat is considerably increased when the pressure of the gas is increased. The escaping gases are therefore expanded only so far that their pressure at the entrance into the regenerator is still sufficiently high to permit of a large transference of heat being obtained. It is well known that for the reduction of the combustion temperature a large surplus of air is the only means by which a high thermal efficiency is obtained. However, in order to bring such a large weight of air, during each cycle, to that pressure which, for the reasons above stated, would insure a large transference of heat in the regenerator, a large expenditure in compression work would be required which would reduce the advantage obtained by regeneration. Therefore in the second stage, utilizing gas discharged from the first stage, only such a portion of the weight of such discharged gases is allowed to expand down to atmospheric pressure and reach the exhaust, as is equal to the weight of fresh mixture or fresh air introduced into the cycle of operation for the combustion of the liquid fuel.

The dilution of the mixture required for the reduction of the temperature is effected by means of the exhaust gases which are still under pressure after they have transferred their heat in the regenerator. As is well known the compression work decreases with the absolute temperature, and is also indirectly proportional to the molecular weight. The lower the absolute temperature and the greater the molecular weight of the gas, the smaller is the expenditure of work in the compressor. The large transference of heat at high pressure permits of the exchange of heat between the exhaust gases flowing to and away from the combustion chamber being continued also below the surrounding temperature, and consequently of carrying the compression to the combustion pressure of those exhaust gases which are supplied again for the working of the cycle at such low temperatures as it appears most advantageous for the gas used for producing cold. In view of the fact that the gases flow in opposite directions, the production of cold has only to replace the losses of cold produced by radiation and development of heat of the compressors, so that the decrease in temperature can be continued to the liquefaction of the gases. Owing to the larger molecular weight the large proportion of $CO_2$ contained in the exhaust gases reduces the compression work as compared with the process working with pure air. As on the other hand, the outlet velocity decreases with the molecular weight, assuming the reduction of heat to be the same, a better wheel efficiency is obtained according to the present method, as compared with methods working with a surplus of air.

The accompanying drawings illustrate two arrangements of apparatus in which the working method hereinbefore described may be carried into effect.

Figure 1 represents the first arrangement and Fig. 2 the second arrangement.

Referring to Fig. 1 of the drawings, 1 is the combustion chamber terminating in nozzles 2. 31 is the rotor of the turbine which is provided on its periphery with blades 3 arranged to rotate in front of the diffuser openings 4, exhaust passage 24 and low pressure nozzles 23. The diffuser 4 leads to the regenerator 5 which is connected with a pipe 20 leading into the low pressure chamber 22 by means of a pipe 21. The exhaust passage 24 leads to an exhaust pipe 25. A cooler 7 is interposed between the heat regenerator 5 and a regenerator of cold 9, to which it is connected by means of the pipes 6 and 8 respectively. The fresh mixture or the air of combustion for liquid fuel is sucked in through a pipe 17 and compressor 29, and is introduced by means of a pipe 15 into the regenerator; it may however be caused to enter the combustion chamber 1 directly through the pipe 19 thus avoiding the regenerator 5. The gases or vapors flowing away from the regenerator of cold 9 are conveyed into the return part of the regenerator 9 through pipe 10, cooler 11 and pipe 12, 13 by means of a compressor 30 and pipe 14. 26 is the inlet of the cooling liquid into the compressor 30. After the cooling liquid or gases have flowed through the compressor they pass through a pipe 36 into the cooler 11, and leave the same through a pipe 27. Cooling chambers 32 and 33 are provided for the cooling of the nozzles and of the combustion chambers.

In the arrangement illustrated in Fig. 2 the cooler 7 is connected by means of pipe 8 to the compressor 38; the pipe 16 leads into this compressor. The other parts of the plant are conformable to the Fig. 1, with the exception of the parts 9, 11 and 30 which are eliminated.

The mode of operation of the arrangement shown in Fig. 2 when liquid fuel is employed is as follows: The pressure in the combustion chamber 1 is constant say, for example, 30 atmospheres. The exhaust gases and the air of combustion flowing in through the opening 18 mix with the fuel blown in through the nozzle 28, and the fuel burns under constant pressure. The velocity of the gas in the combustion chamber should not reach the ignition velocity corresponding to the mixture, so that unburned fuel should not reach the nozzle 2. The highly heated combustion gases expand through the nozzle 2 to say 8 atmospheres, act against the blades 3 of the turbine wheel 31, and their kinetic energy is converted into work and heat. When leaving the wheel 31 the gases flow through the diffuser 4 into the regenerator 5. The outlet energy can be reconverted into pressure by the diffuser 4. The exhaust gases give most of their heat to the exhaust gases and fresh air coming in at 35, so that they reach the outlet 6 only with the difference of temperature required for the transference of heat between a new and a preceding charge. The air of combustion that was sucked in through pipe 17 and compressor 29 and was compressed to 30 atmospheres, passes into the regenerator through the pipe 15. The exchange of heat in the regenerators is continued to the temperature of the atmosphere, a part of the exhaust gases is taken away from the fresh supply of air of combustion through the pipe 20, and is led through the pipe 21 into the low pressure reservoir 22. These exhaust gases expand through the nozzle 23 to atmospheric pressure in the turbine wheel 31, thereby producing work and cooling the blades, then into the exhaust, and finally into the atmosphere. The other exhaust gases are cooled down as much as possible in the cooler 7. They are sucked in under a pressure of 8 atmospheres by the compressor 38, and their pressure is increased to the combustion pressure of 30 atmospheres. Thereupon the gases reach again the regenerator 5 by means of the pipe 16, (Fig. 2), and they mix therein with the air flowing in through the pipe 15 and flow through in opposite direction to the exhaust gases from which they absorb the heat.

From the regenerator 5 the gases flow through the pipes 37 and 18 to the chamber of combustion 1. It is evident, that the exchange of heat is continued to the outside temperature. In the arrangement illustrated in Fig. 1 the exchange of heat is continued below the outside temperature, and the operation is as follows: After the combustion gases have flowed through the cooler 7 as mentioned, they reach the regenerator of cold 9 and coming in through the opening 8, they take as much as possible the temperature of the exhaust gases flowing in the opposite direction, the temperature of which we will preliminarily assume to be 150° absolute. The exhaust gases flowing in through the pipe 14 and coming from the compressor 30, had assumingly a temperature of 150° absolute.

The exhaust gases escaping through the pipe 10, are cooled in the cooler 11 by means of a cooling member so much that after they have been compressed in the compressor 30 to 30 atmospheres, they reach a temperature of for example 150° absolute. The compressor 30 pushes the exhaust gases compressed to 30 atmospheres through the pipe 14 to the regenerator 9; in this regenerator the gases withdraw the heat from the gases flowing in opposite direction through the regenerator. The exhaust gases flow into the regenerator 5 through the pipe 35 and withdraw the heat from the gases traversing the regenerator in opposite direction. From the regenerator 5 the exhaust gases flow through the pipe 37 into the chamber of combustion 1.

The cooling chambers of the compressor 30 act as an evaporator of the cooling fluid flowing in at 26, which after it has passed through the compressor as mentioned, flows through the cooler 11 and leaves the same again through the pipe 27. The cooling fluid may be either $CO_2$ or $NH_3$ or any desired gas, liquid or vapor.

The output may be increased according to the load of the machine by increasing all the working pressures corresponding to the absolute pressure without any constructive alterations of the plant being required.

In order to reduce the compression work of the compressor 29, the same should suck in a quantity of air that is a little greater than that which is theoretically required. The combustion in the combustion chamber should take place according to the known method of the flameless surface combustion, for which purpose the chamber should be wholly or partly filled with suitable material. The fresh air that is sucked in may be mixed with the exhaust gases after it has been compressed to the pressure of the latter, in the described case 8 atmospheres absolute, and then compressed to 30 atmospheres and led into the regenerator. By this arrangement the high pressure stage of the air compressor is dispensed with, and on the other hand the exhaust gas compressor is improved by increasing the quantity compressed from 8 to 30 atmospheres.

The exhaust gases escaping through the pipe 20 may be taken away at any desired point of the regenerator 5, or even before the inlet thereto, according to the temperature of the low pressure stage corresponding to the cooling of the wheel blades 3; consequently the output of the low pressure stage may vary.

When working with gas, it is advisable in order to prevent premature ignition, to compress and regenerate separately, and to effect the mixing and the combustion in the combustion chamber 1.

What I claim is:

1. A method of working combustion turbines which consists in expanding the gases of combustion in the working nozzles, cooling the expanded gases allowing part of said gases to escape, compressing the remaining cooled gases to the combustion pressure, heating said gases, and delivering them to the combustion chamber together with enough air to support the combustion of the fuel.

2. A method of working combustion turbines which consists in expanding the gases of combustion in the working nozzles to a pressure above the final exhaust pressure, causing the expanded gases to give up heat to the incoming charge to the combustion chamber allowing a portion of said gases to escape, compressing the cooled gases which are then caused to absorb the heat from the expanded gases, and delivering them to the combustion chamber together with enough air to support the combustion of the fuel.

3. A method of working combustion turbines which consists in expanding the gases of combustion in the working nozzles to a pressure above the final exhaust pressure, cooling the expanded gases, exhausting a portion of said gases, compressing the remainder of said gases to the combustion pressure, heating the latter gases, and delivering them to the combustion chamber together with enough air to support the combustion of the fuel.

4. A method of working combustion turbines which consists in expanding the gases of combustion in the working nozzles to a pressure above the final exhaust pressure, cooling the expanded gases, further expanding a portion of the gases in other working nozzles, compressing the remainder of the cooled gases to the combustion pressure, heating the latter gases, and delivering them to the combustion chamber together with enough air to support the combustion of the fuel.

5. A method of working combustion turbines which consists in expanding the gases of combustion in the working nozzles to a pressure above the final exhaust pressure, cooling the expanded gases, exhausting a portion of said gases, compressing the cooled gases to the combustion pressure, heating the latter gases and delivering them to the combustion chamber, and delivering to the combustion chamber a quantity of compressed air equal to the portion of the gases exhausted.

6. A method of working combustion turbines which consists in expanding the gases of combustion in the working nozzles to a pressure above the final exhaust pressure, causing a transference of heat from the expanded gases to the incoming charge to the combustion chamber allowing a portion of the expanded gases to escape, further cooling the expanded gases, compressing the cooled gases to the combustion pressure, heating the said gases by the transference of heat from the said expanded gases and delivering them to the combustion chamber together with enough air to support the combustion of the fuel.

7. A method of working combustion turbines which consists in expanding the gases of combustion in the working nozzles to a pressure above the final exhaust pressure, cooling the expanded gases allowing a portion of the gases to escape, compressing the remaining cooled gases to the combustion pressure, heating the said gases and delivering them to the combustion chamber, compressing air to the combustion pressure, heating the air and delivering it to the combustion chamber, and injecting the fuel into the combustion chamber.

8. In a combustion turbine plant, the combustion comprising a combustion chamber, nozzles on this chamber, a rotor having blades on its periphery which pass in front of said nozzles, a regenerator for the exhaust gases, means for discharging a portion of the gases from said regenerator, a compressor sucking air for the combustion, a compressor sucking exhaust gases from said regenerator, the said compressors delivering the air and gases into the reverse section of the regenerator, and means for passing said air and gases from the regenerator into the combustion chamber.

9. In a combustion turbine plant, the combination comprising a combustion chamber, nozzles on this chamber, a rotor having blades on its periphery which pass in front of said nozzles, a regenerator for the exhaust gases, a low pressure chamber, low pressure nozzles on this chamber, means for leading a part of the exhaust gases from the regenerator to said low pressure chamber, a compressor sucking air for the combustion, a compressor sucking exhaust gases from said regenerator, the said compressors delivering the air and gases into the reverse section of the regenerator, and means for passing said air and gases from the regenerator into the combustion chamber.

10. In a combustion turbine plant the combination comprising a combustion chamber, a nozzle for the supply of fuel into said chamber, nozzles for the expanding of the gases of combustion, a rotor having blades on its periphery which pass in front of the said nozzles, a diffuser catching the gases flowing from the rotor, a regenerator receiving the gases from said diffuser, a low pressure chamber, means of communication between the regenerator and the low pressure chamber, two compressors one of which sucks air for the combustion, the other of which sucks exhaust gases from the regenerator, said compressors discharging the air and gases through the regenerator in the opposite direction to the flow of the exhaust gases therethrough, and means for passing the compressed air and gases from the regenerator to the combustion chamber.

11. In a combustion turbine plant the combination comprising a combustion chamber, nozzles on this chamber, a rotor having blades on its periphery which pass in front of said nozzles, a regenerator for the exhaust gases, a low pressure chamber, low pressure nozzles on said chamber, means for leading a part of the exhaust gases from the regenerator to said low pressure chamber, a cooler for the other part of the exhaust gases, two compressors, one of said compressors sucking air for the combustion, the other sucking exhaust gases from the cooler, said compressors discharging the air and gases through the regenerator in the opposite direction to the flow of the exhaust gases therethrough, and means for leading the compressed air and gases from the regenerator to the combustion chamber.

12. In a combustion turbine plant the combination comprising a combustion chamber, nozzles on this chamber, a rotor having blades on its periphery which pass in front of the nozzles, two regenerators for the exhaust gases, a low pressure chamber, low pressure nozzles on said chamber, means for leading a part of the exhaust gases from one of the regenerators to said low pressure chamber, coolers, one of said coolers being disposed between the regenerators, a compressor sucking fresh air and delivering it into one of said regenerators, a passage leading from one of the regenerators to the combustion chamber, a compressor sucking gases from one of said coolers and discharging into one of said regenerators.

In testimony whereof, I have signed my name to this specification.

BERNHARD BISCHOF.

In presence of—
FRANK DIURMKE,
EMIL MEILE.